Patented May 20, 1941

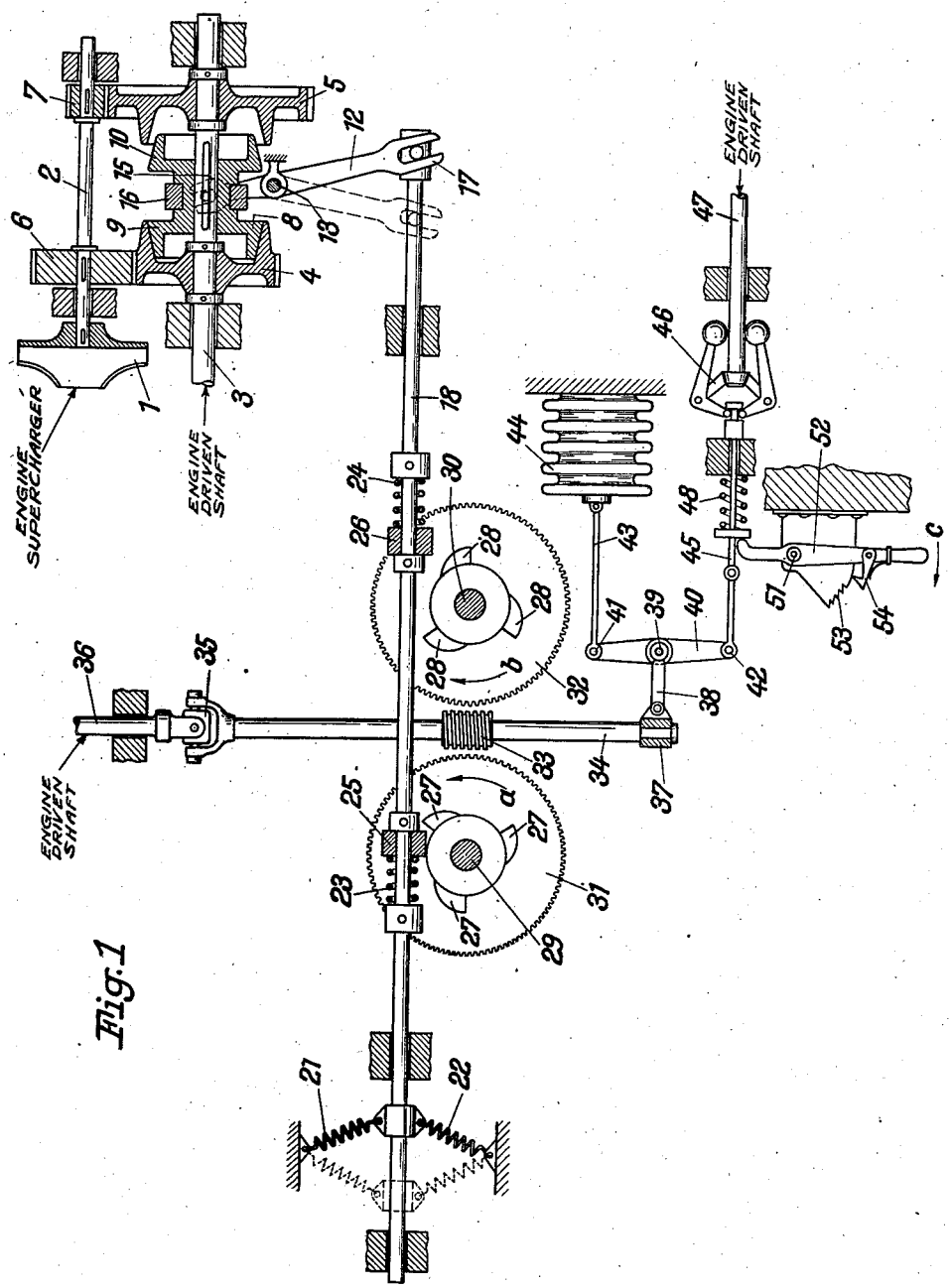

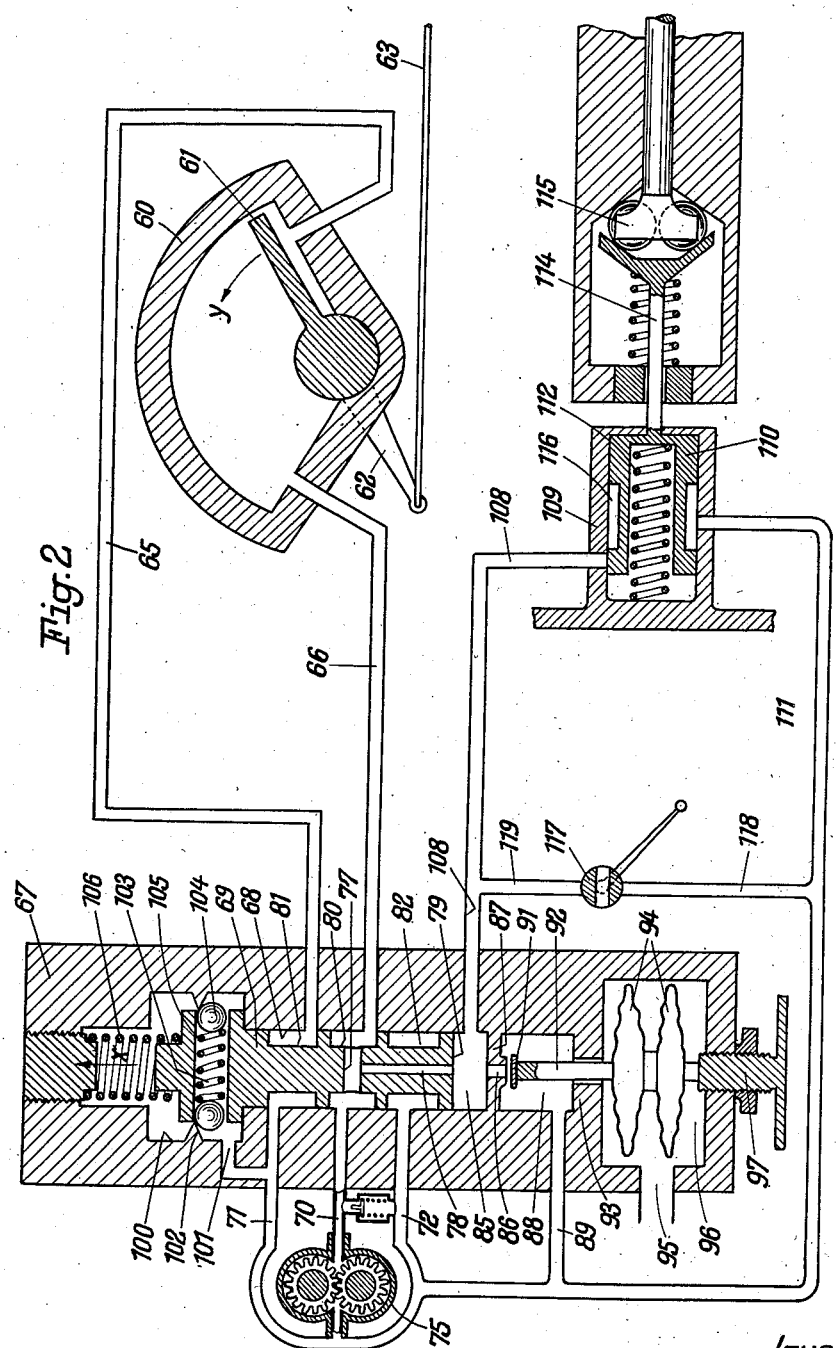

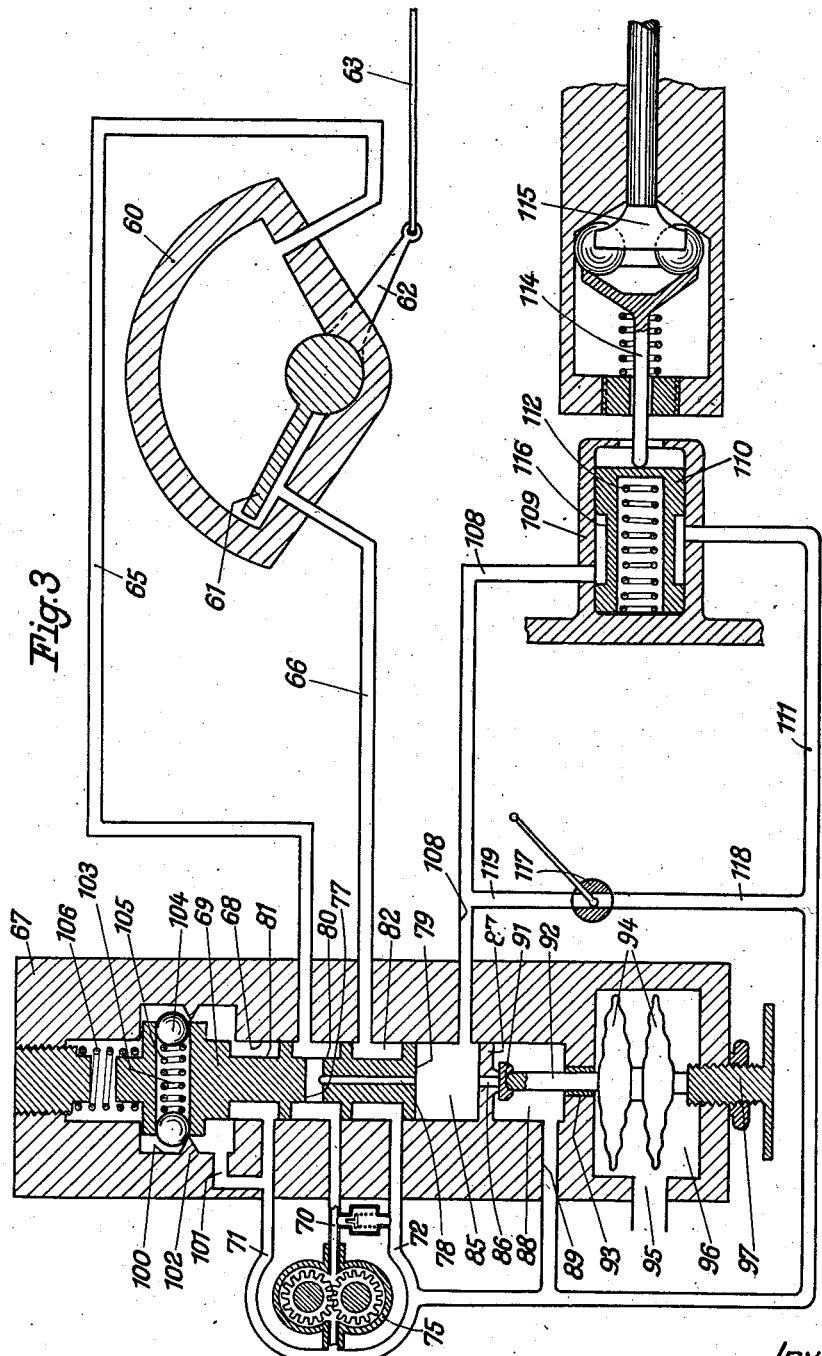

2,242,374

UNITED STATES PATENT OFFICE 2,242,374

AUTOMATIC CONTROL OF TWO-SPEED GEARS IN AIRCRAFT

Erich Schultz and Friedrich Bielitz, Dessau, Germany, assignors to Junkers Flugzeug-und-Motorenwerke Aktiengesellschaft, Dessau, Germany Application August 23, 1938, Serial No. 226,264
In Germany September 11, 1937

8 Claims. (Cl. 123—119)

Our invention relates to aero engines and more especially to means for controlling the operation of engines supplied with compressed combustion air. It is an object of our invention to provide means whereby the quantity of compressed air fed to the engine is varied automatically corresponding to the altitude at which the craft is flying.

In view of the rapid drop of the specific gravity of the atmospheric air at higher altitudes the internal combustion engines serving for the propulsion of aircraft must be supplied with varying quantities of pre-compressed air if their performance shall remain equal at all altitudes. In accordance herewith the superchargers, preferably of the rotary blower type, serving to feed compressed air to the engine are required to adapt their performance to different altitudes of flight. To this end the superchargers have been provided with change speed gears serving to change the number of revolutions of the rotor which determine the performance of the supercharger. In order to avoid complicated design of the change speed gear, as a rule a two speed gear is used which enables the supercharger to operate up to a predetermined altitude at lower and beyond that altitude at higher speed and with a corresponding variation of performance, acting in the first case as "ground supercharger," in the second case as "altitude supercharger."

The present invention relates more particularly to means for reversing such a two speed gear connected with a supercharger, these reversing means being so designed that the reversing occurs very quickly in order to avoid a protracted slip in the clutches which couple the rotary part of the supercharger either with the low speed or with the high speed gear driven by the driving part (for instance the engine crankshaft), since such slip would be accompanied by an obnoxious heating up and wearing of the parts. It is an object of this invention to keep the clutches always perfectly operative or perfectly inoperative and to provide for the quickest possible transition from the operative to the inoperative position and vice versa, this being particularly important in view of the very high numbers of revolution of the superchargers. The same effect shall also be obtained at all actuations of the reversing device, no matter for what purpose and by what influences this device is actuated. Another object of the invention is the provision of means for automatically reversing the gear at a predetermined altitude, the optional reversing from higher to lower performance of the supercharger and, as an emergency reversal, the automatic throwing in of the lower performance in the case of unduly high speed of the engine such as may occur for instance during a nose dive, when an unduly high stressing of the supercharger rotor must be avoided. The reversing device shall further be so designed that the automatic reversal is already brought about by a slight variation of the atmospheric air pressure, i. e. within small differences of altitude, so that the charger is prevented from unnecessarily operating as altitude supercharger with high performance.

In accordance with these requirements the reversing device according to this invention is fitted with a snap action shifting mechanism which is moved quickly from one to another end position under the action of an auxiliary force which is adjusted in dependency from the altitude (or also manually or by other influences) and in so moving, adjusts means for reversing the supercharger gear. The control of the auxiliary force adjusting the snap action shifting mechanism requires only little energy and a short movement of a control member, such as a bellows responding to variations of the density of the air. Therefore such a control device is highly sensitive, responding already to very slight variations of the density, so that the automatic reversal of the supercharger gear, which is controlled by the density of the air, occurs approximately at the same altitude during a climb as well as during a descent.

In the drawings affixed to this specification and forming part thereof two embodiments of our invention are illustrated diagrammatically by way of example.

In the drawings

Fig. 1 is a diagrammatic showing of a reversing device for the supercharger gear, which is actuated by a mechanical auxiliary force, while Figs. 2 and 3 are similar views of a reversing device, actuated by hydraulic means, in two different positions.

Referring to the drawings and first to Fig. 1, 1 is the rotor of the supercharger, fixed on a shaft 2 which is driven by an engine (not shown) which drives the shaft 3. On the shaft 3 are loosely mounted two gears 4 and 5, each of which meshes with a gear 6 and 7, respectively, fixed on the shaft 2. The gear couples 4, 6 and 5, 7 have different ratios of speed transmission. On the shaft 3 a clutch member 8 is mounted for axial displacement, but secured against angular displacement. Clutch member 8 can be coupled with either one or the other gear 4 and 5 by means of friction cones 9 and 10, respectively, so that according to the position of the clutch member the rotor 1 of the supercharger is driven at lower or higher speed. The clutch member 8 is shifted by means of a double-armed lever 12 oscillating about a fixed journal 13 and gripping with one end 15 the ring 16 encircling the clutch member 8, while its other end 17 is linked to a longitudinally displaceable rod 18. On this rod act two pressure springs 21, 22 arranged after the manner of a toggle lever, which according to whether they are forced to the left or the right, exert a thrust in the same direction on the rod 18. On this rod are further mounted coil springs 23, 24 and stops 25, 26 arranged to be displaced in different directions, which coact with the cams 27 and 28 mounted on axles 29 and 30, respectively, which also carry gear wheels 31 and 32 fixed to the cams 27 and 28, respectively and between which is located a worm 33 mounted on a shaft 34 which is connected by means of a Cardan joint 35 with the permanently rotating driving shaft 36, while its free end is connected by means of a sleeve 37 and link 38 to the pivot point 39 of a double-armed lever 40. One end 41 of this lever is connected by means of a link 43 to a bellows 44 acted upon by the atmospheric pressure. Its other end 42 is connected by means of the rod 45 to a centrifugal governor 46, the spindle 47 of which is coupled with the propeller engine. The centrifugal governor is so constructed that the tension of its spring 48 is overcome only if the propeller engine rotates at unduly high speed. Therefore during normal operation the hinge point 42 remains stationary. A hand lever 52 hinged about a fixed point 51 can be made to act on the rod 45 and is held in any predetermined position by means of the notches 53 and pawl 54.

This device operats as follows:

Owing to the instability of the extended position of the compression springs 21, 22 arranged after the manner of a toggle lever, the rod 18 will always take up either one or the other of two end positions, so that the clutch member 8 will be coupled either with the gear 4 of the lower step 4, 6 or with the gear 5 of the higher step 5, 7. In the position shown in the drawings the lower step 4, 6 is thrown in, and the parts are set for operation as ground supercharger. When climbing to higher altitudes, the bellows 44 will expand in proportion to the dropping air pressure and will rock the lever 40 about the pivot point 42, thereby also rocking shaft 34 carrying the worm into engagement with the worm wheel 31 and setting this wheel and the cams 27 rotating in the direction of the arrow a. A cam 27 striking the stop 25 will shift this stop against the action of spring 23, until the compression of this spring can counteract the force of springs 21, 22 and throw the shaft 18 into the other end position with the springs 21, 22 extending in the position shown in dotted lines. By this movement of the shaft the lever 12 is caused to quickly shift the clutch member 8 to the right, thereby throwing out the gearing 4, 6 and throwing in the clutch member 10 and gearing 5, 7, so that now the rotor 1 of the supercharger is set rotating at a higher speed. At the same time the stop 25 comes out of reach of the cams 27, which are thus free to rotate without being hindered.

On the craft descending again, the rising air pressure will cause the bellows 44 to be compressed and the lever 40 and shaft 34 to be rocked in opposite position, wherein the worm 33 is carried into engagement with the wheel 32, which is now rotated in the direction of arrow b together with the cams 28. One of the cams meeting stop 26, which was shifted farther to the left, will cause this latter to compress its spring 24 until it is able to overcome the resistance offered by the springs 21, 22, whereupon the rod 18 is forced back of a sudden into the position shown in the drawings, in which the lower step 4, 6 of the power transmission gearing is thrown in. If with the higher gearing in operation the speed of the propeller engine should rise unduly, the governor 46 will come into action, which counter to the action of the spring 48 will pull the rod 45 to the right, whereby the lever 40 will be rocked to the right about the pivot point 41, rocking the shaft 34 so that the worm 33 is brought into engagement with wheel 32 which will now throw in the lower step 4, 6, as described above. Obviously this reversal of the gear may also be effected manually by means of the lever 52, which, on being rocked to the left in the sense of the arrow c, shifts the rod 45 to the right.

The worm 33 and wheels 31, 32 might also be replaced by other alternately operative means such as friction wheel gearings, friction clutches etc.

In order to guarantee a quick engagement of the worm 33 with one or the other wheel 31, 32, another spring toggle similar to 21, 22 might be inserted in the connection of the rod 43 and lever 40 with the worm gear.

In the reversing gear operated by hydraulic means, which is shown in Figs. 2 and 3, the clutch of the two speed gear is reversed by means of an oscillatory vane piston 61 arranged in a closed casing 60 and connected by means of a lever arm 62 with a system of rods 63 leading to the clutch (not shown). Two pipes 65 and 66 leading to the interior of the casing 60, however on opposite sides of the vane 61, serve for controlling the flow of the pressure liquid. These pipes lead to a control case 67 formed with an axial bore 68, in which a control slide 69 can be reciprocated. With the bore 68 communicate three conduits 70, 71, 72, the middle one (70) communicating with the pressure side, the two others (71, 72) with the suction side of a permanently rotating gear pump 75, which places the liquid under pressure. The piston or slide 69 is formed with three circumferential grooves 80, 81, 82, which are so arranged that in all positions of the piston slide the conduit 70 communicates with the groove 80, conduit 71 with groove 81 and conduit 72 with groove 82. On the other hand the pipes 65 and 66 end in the bore 68 in such position that they communicate in one end position of the piston slide, shown in Fig. 2, with the grooves 81, 80, in the other end position (Fig. 3) with the grooves 80 and 82. In the part formed with the groove 80 the piston slide is formed with a radially extending bore 77, which communicates by means of a narrow axial bore 78 with the part 85 of the bore 68 which adjoins the bottom end face 79 of the piston slide. This space 85 is separated by a partition 87, formed with a bore 86, from a space 89, which permanently communicates with the suction side of pump 75. With the bore 86 coacts a valve 91 mounted on a rod 92, which extends across the wall 93, being packed therein, and is connected to a bellows 94. This bellows is enclosed in a chamber 96, communicating with the ambient air through an opening 95 and can be adjusted within certain limits by means of an adjusting device (set screw) 97.

At the other end the bore 68 merges into a chamber 100, which permanently communicates by way of a conduit 101 with the suction side of pump 75. The lateral wall of this chamber is formed about in the middle with projections 102 of triangular cross section. The widened part, extending into the chamber 100, of the control piston is formed with a radial bore 103, in which are arranged two balls 104, which are permanently forced towards the outside by a spring 105 inserted between them. The balls 104 rest against the projections 102. In the direction of movement of the piston slide 69 the slide is acted upon, from without, by a precompressed coil spring 106, which abuts against the casing 67, tending to force the piston slide downwardly.

From the chamber 85 a conduit 108 leads to a casing 109, in which a piston slide 110 is arranged for axial reciprocation, a conduit 111 leading back to the suction side of the pump 75. On one side of the slide 110 acts a pressure spring 112, on the other side the rod 114 of a centrifugal governor 115, which is driven by the propeller engine. In the normal position shown in the drawings the slide 110 shuts off the inlet 108. It is formed with a circumferential groove 116 which communicates with the conduit 111 and, on the slide being shifted to the left, sets the conduits 111 and 108 in communication. In a branch pipe of conduit 108 is inserted a manually operable cock 117, from which another branch line 118 leads to the line 111 and to the suction side of the pump.

Fig. 2 illustrates the position of the parts corresponding to flight in air of higher specific gravity, in which the supercharger operates with lower power transmission. The pressure fluid flows from the pump 75 to the middle groove 80 of the piston slide 69 and through pipe 66 acts on the vane piston 61, so as to hold it in the position, in which the lower power transmission step is thrown in. At the low altitude the bellows 94 is compressed and the valve 91 thus uncovers the bore 86 so that the pressure fluid entering the chamber 85 through the narrow bore 78 can flow through bore 86 and chamber 88 into the conduit 89. By way of bore 78 the conduits 108 and 119 are also in communication with the pressure pipe 70. As long, however, as the control members 110 and 117 are in the position shown in Fig. 2, they do not influence the operation to be described hereinafter.

When the aircraft climbs to higher altitudes, the bellows 94 will expand and shift the valve 91 to cover and close the conduit 86. This results in a rise of pressure in the chamber 85 and as soon as the pressure exceeds the predetermined tension of the spring 106, the slide 69 is shifted in the direction of the arrow x. The two balls 104 participate in this movement and at the same time also move in the transverse direction while remaining in contact with the edge of the projections 102. The springs 105 and 106 are so organized that the forces opposed by them to the movement of the slide 69 and the balls 104 in the direction x drop as the movement proceeds. Therefore, when the pressure acting on the slide 69 in the chamber 85 has become high enough to displace the slide, it will, owing to this organization of the slide, cause it to change over into the other end position (shown in Fig. 3) with a jerk. The pressure liquid flowing through the conduit 70 into the groove 80 now reaches the pipe 65 and acts on the vane 61 in the direction where the vane is turned in the sense of the arrow y (Fig. 2), until the vane has reached the end position shown in Fig. 3. At the same time the vane 61 acts on the rod 63 leading to the change speed gear, which is adjusted to the position corresponding to the higher speed, so that now the supercharger operates at the higher speed, i. e. as altitude supercharger. The snap action mechanism formed by the projections 102, the balls 104 and the spring 105 provides for a quick reversal of the liquid inlet and outlet to the means 60, 61 for adjusting the reversing gear. In consequence thereof the clutch member of the change speed gear passes quickly from one to the other end position. The snap action mechanism, which can take up only one or the other end position, prevents the clutch member of the change speed gear from stopping in any position other than the end positions. The liquid displaced from the casing 60 on the vane 61 being turned flows through the pipe 66 to the groove 82 and further through conduit 72 back to the suction side of the pump 75.

When the craft descends again, the bellows 94 is compressed again, and the valve 91 now uncovers the bore 86, whereby the pressure in the chamber below the slide 69 is reduced. As soon as this pressure has dropped sufficiently, the spring 106 under tension shifts the slide 69 downwardly, the snap action mechanism 102, 104, 105, jumping back into its initial position and causing the slide 69 to be jerked into its lower end position according to Fig. 2. The pressure fluid flowing from the conduit 70 towards the slide is now once more conducted through conduit 66 to the vane casing 60, forcing the vane 61 into the position shown in Fig. 2, in which the supercharger operates at the lower speed.

When the device is set for operation as altitude supercharger (at high speed) according to Fig. 3, a reversal for operation at lower speed can also be brought about at any time within the range of lower air density. In order to attain this, it is only necessary to reduce the pressure in the chamber 85 below the piston slide. This may be effected for instance, in the case of an unduly high speed of the propeller engine, by the centrifugal governor 115 so adjusting the slide 110, that the conduit 118, by way of its groove 116, enters into direct communication with the pressure conduit 111, or by the valve 117 being opened manually. All this is shown in Fig. 3.

While in the embodiment of Fig. 1 the adjusting of the snap action mechanism as well as the control of the clutch member are effected by mechanical means, in the embodiment of Figs. 2 and 3 hydraulic means are provided for setting the snap action mechanism as well as the clutch member. According to the invention these modes of operation may also be combined in a different manner. Thus a snap action mechanism adjustable by hydraulic means may be combined with a mechanically controlled clutch member, or a mechanical snap action mechanism with a clutch member controlled by hydraulic means. In the device of Figs. 2 and 3 it is further possible to arrange a hydraulically or mechanically adjustable snap action mechanism separately from the piston slide. Instead of actuating this mechanism or the clutch member by hydraulic means also electrical means may be provided for the same purpose, and the pressure liquid might also be replaced by a gas under pressure.

Various changes may be made in the details disclosed in the foregoing specification without departing from the invention or sacrificing the advantages thereof.

We claim:

1. In combination with an aircraft engine supercharger having a change speed transmission and a clutch therefor, clutch control means for said transmission comprising a snap action shifting mechanism connected to said clutch, and means for automatically actuating said mechanism in either of two directions.

2. In the combination of claim 1, said mechanism including a movable rod connected to said clutch, and compression springs joined to said rod and arranged as a toggle means for snapping said rod in one direction or the other.

3. In the combination of claim 1, said actuating means comprising a pivotally mounted rotatable shaft, means for transmitting rotations of said shaft into limited linear movement of said mechanism, and means for pivoting said shaft into engagement with said transmitting means.

4. In the combination of claim 1, said mechanism comprising a linearly movable rod having stops thereon, and said actuating means comprising two rotatable cam members adapted to engage said stops for moving said rod, a rotatable shaft, and means for bringing said shaft into actuating engagement with one or the other of said cam members.

5. In the combination of claim 1, said mechanism comprising a hydraulic piston, and said actuating means comprising a pump, a valve, conduit means connecting said pump and valve to said piston, and means for actuating said valve by fluid pressure from said pump.

6. In the combination of claim 1, said mechanism comprising a hydraulic piston, and said actuating means comprising a pump, a valve, conduit means connecting said pump and valve to said piston, said valve including a fluid chamber at one end thereof and snap action spring means at the other end thereof, and means for actuating said valve by producing fluid pressure in said chamber from said pump.

7. In the combination of claim 1, said mechanism comprising a vane piston, and said actuating means comprising a fluid circulation system for said piston and including a fluid pump and a valve, and means for operating said valve to reverse the flow of fluid in said system.

8. In combination with an engine supercharger having a change speed transmission, clutch control means for said transmission comprising a snap action shifting mechanism connected to said clutch, first means responsive to changes in barometric pressure for actuating said mechanism, and second means responsive to changes in engine speed for actuating said mechanism.

ERICH SCHULTZ.
FRIEDRICH BIELITZ.